Sept. 23, 1958     O. F. POLLEYS     2,853,258
AIRCRAFT EJECTION SEAT APPARATUS
Filed Dec. 17, 1953     3 Sheets-Sheet 1

INVENTOR
OWEN F. POLLEYS
BY
ATTORNEYS

Sept. 23, 1958
O. F. POLLEYS
2,853,258
AIRCRAFT EJECTION SEAT APPARATUS
Filed Dec. 17, 1953
3 Sheets-Sheet 2
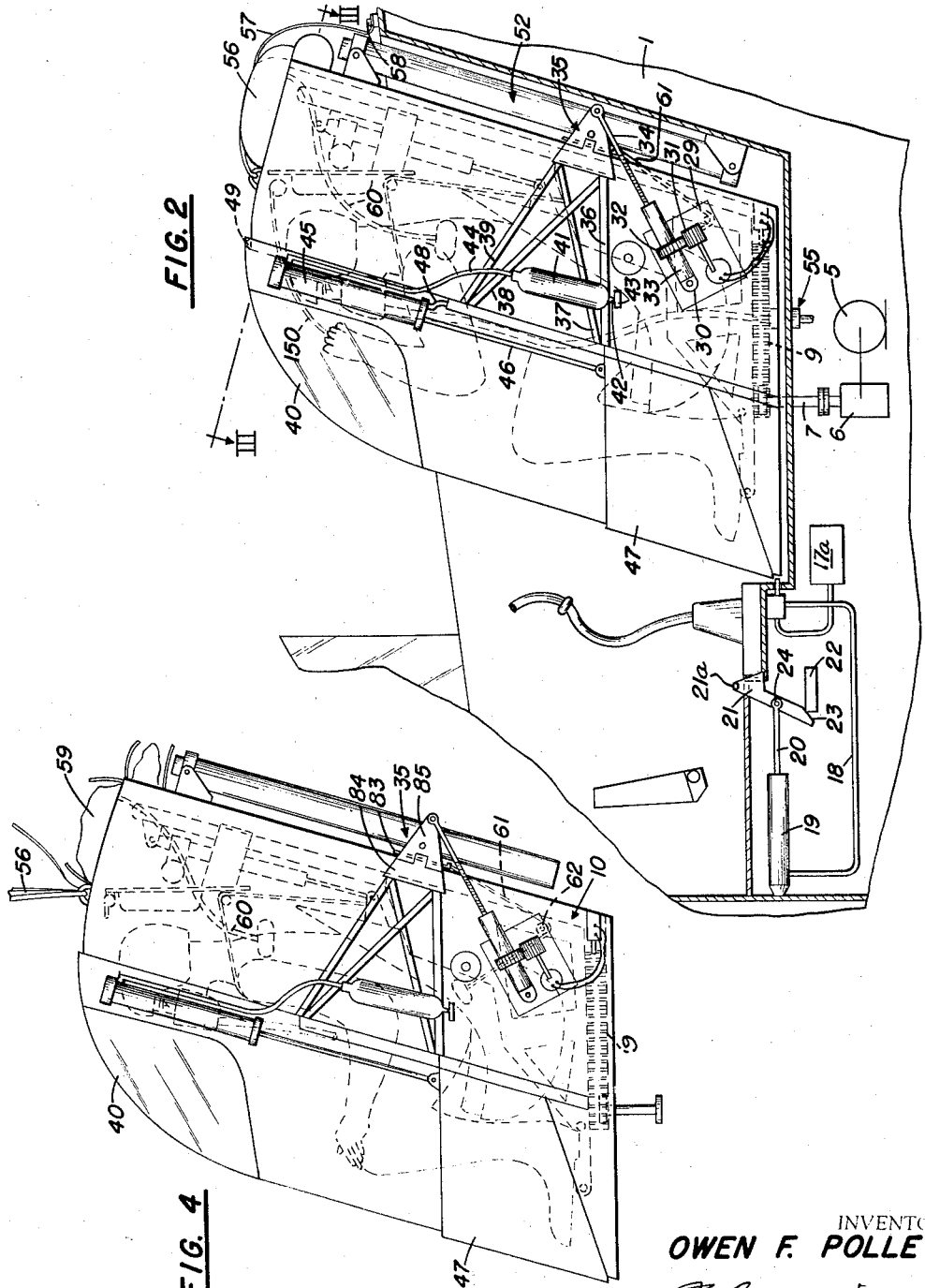
INVENTOR
OWEN F. POLLEYS
BY
ATTORNEYS Sept. 23, 1958     O. F. POLLEYS     2,853,258
AIRCRAFT EJECTION SEAT APPARATUS
Filed Dec. 17, 1953     3 Sheets-Sheet 3
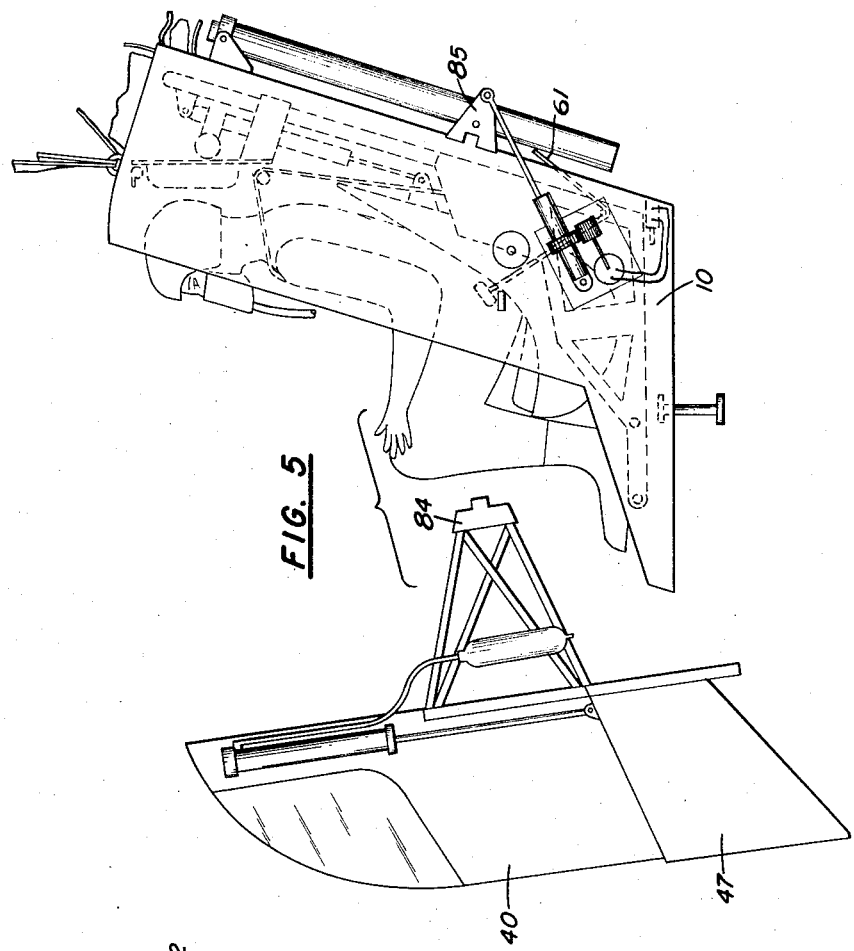
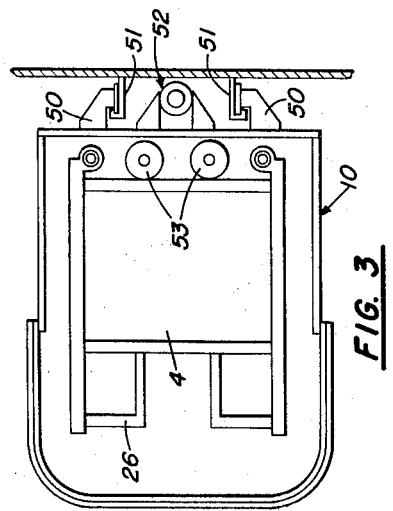
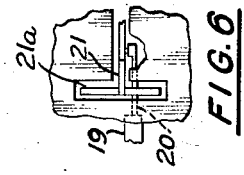
INVENTOR
OWEN F. POLLEYS
BY
ATTORNEYS

United States Patent Office 2,853,258
Patented Sept. 23, 1958

2,853,258

AIRCRAFT EJECTION SEAT APPARATUS

Owen F. Polleys, Windsor, Conn., assignor, by mesne assignments, to Chance Vought Aircraft, Incorporated, a corporation of Delaware Application December 17, 1953, Serial No. 398,706

13 Claims. (Cl. 244—122)

This invention relates to an ejectable seat capsule which is utilized for facilitating the escape of a pilot from an aircraft when an emergency occurs while the aircraft is travelling at high speed and altitude.

Many problems arise when a pilot has to abandon an aircraft which is travelling at a Mach number greater than one and at altitudes in excess of thirty thousand feet. These problems relate primarily to the safety of the pilot in escaping from the moving aircraft and then descending safely to earth. It is well known that the human body, if ejected from a rapidly moving aircraft without adequate protection in the above mentioned speed range, is incapable of withstanding the forces imposed upon it by the high impact pressure of the air stream. It is also well known that the human body should not be subjected for any prolonged time to the low temperatures and low atmospheric pressures which exist at altitudes in excess of thirty thousand feet.

With these basic problems in mind certain prior art suggestions have been proposed for the purpose of facilitating the safe escape of a pilot from an aircraft at high speeds and altitudes. However these suggestions have certain limitations which render them objectionable. One proposed solution to the problem was to shear off the entire cockpit enclosing the pilot. However the drawbacks involved in this solution are many. It is impractical to catapult such a large section because of its great weight. Furthermore it would be difficult to disconnect the various controls and lines which are attached to the cockpit. Furthermore if it were attempted to catapult a cockpit portion which was not properly disconnected from the main portion of the aircraft, the interference between the cockpit section and the remainder of the aircraft would in all probability result in serious injury to the pilot. It has also been proposed that the pilot wear a special suit which is so constructed as to afford protection against temperatures and pressures which would be encountered during an emergency escape. However this suit would require an oxygen supply and disconnects for all lines leading into it. A suit of this type would be extremely bulky and cumbersome for normal flight operations and maneuvering in addition to being difficult to disconnect from the aircraft in case a forced exit became necessary.

The present invention overcomes the drawbacks of the prior art by allowing the pilot to seal himself in a completely enclosed pressure and heat retaining capsule when it becomes necessary for him to abandon the aircraft. During normal flight procedure, however, the pilot is free of the sealed capsule and is free to pursue his normal flight duties. More specifically, a capsule, which can be ejected from a rapidly moving aircraft at high altitude, is positioned at the rear of the pilot's seat. This capsule has a movable cover which is normally maintained in an open position. When it becomes necessary to abandon the aircraft the pilot and his seat are moved back into the open capsule by appropriate mechanical means. When the seat reaches its proper position in the capsule, the movable cover is moved so as to completely close the capsule. The canopy of the plane is then blown off and the capsule containing the pilot is catapulted clear of the plane. It can be seen that since the capsule was sealed prior to the time that the canopy was blown off that the inside of the capsule retains the cockpit temperature and pressure. After it is separated from the aircraft the ejected capsule is allowed to fall to a predetermined altitude at which time a parachute is opened to allow the capsule to descend thereby, or alternatively, the pilot may free himself from the capsule and continue his descent by his own parachute.

It is one object of this invention to disclose a pilot escape capsule which caters primarily to the safety and efficiency of the pilot. If the pilot knows that in the event of an emergency at high speed and high altitude that he has a good chance to abandon the aircraft the whole psychology of his flight is improved thereby improving his mental and physical dexterity.

It is another object of this invention to disclose a pilot escape capsule which shall be open during normal flight operations and which shall in no way restrict or impede normal pilot functions.

It is another object of this invention to disclose a pilot escape capsule which can be controlled automatically by actuating a single pre-ejection control lever.

It is another object of this invention to disclose a pilot ejection capsule which completely encloses and seals the pilot before the aircraft canopy is removed and thereby retains the cockpit temperature and pressure within the sealed capsule.

It is another object of this invention to provide an ejectable capsule which contains a shoulder harness for bracing the pilot and which is automatically locked prior to ejection of the capsule thereby enhancing the safety of the pilot. Furthermore, during normal flight the harness will be maintained in an unlocked position so as to give the pilot a maximum of freedom of movement.

It is another object of this invention to disclose a pilot ejection capsule which has a minimum of connections with the main portion of the aircraft and thereby makes separation of the capsule from the aircraft easier and less time consuming.

It is another object of this invention to disclose a pilot ejection capsule which the pilot may ride in until it reaches the ground, or alternatively, the pilot may separate himself from the capsule prior to the time it reaches the ground and continue his descent by his own parachute.

It is another object of this invention to disclose a pilot ejection capsule which may be incorporated into existing aircraft with a minimum of labor and expense.

Other objects and many of the attendant advantages of this invention will be readily appreciated as the same becomes better understood by reference to the following detailed description when considered in connection with the accompanying drawings wherein:

Fig. 2 is a view similar to Fig. 1 but showing the ejectable capsule in the closed position prior to ejection from the aircraft.

Fig. 3 is a plan view of the pilot's seat in the closed capsule taken along the line III—III of Fig. 2 and shows one way of positioning of the pilot's oxygen supply bottles.

Fig. 4 is an elevation of the capsule after it has been ejected from the aircraft.

Fig. 5 is an elevation view of the capsule showing the cover portion disconnected from the body of the capsule.

Fig. 6 is a top view of a foot engaging member.

Figure 1:
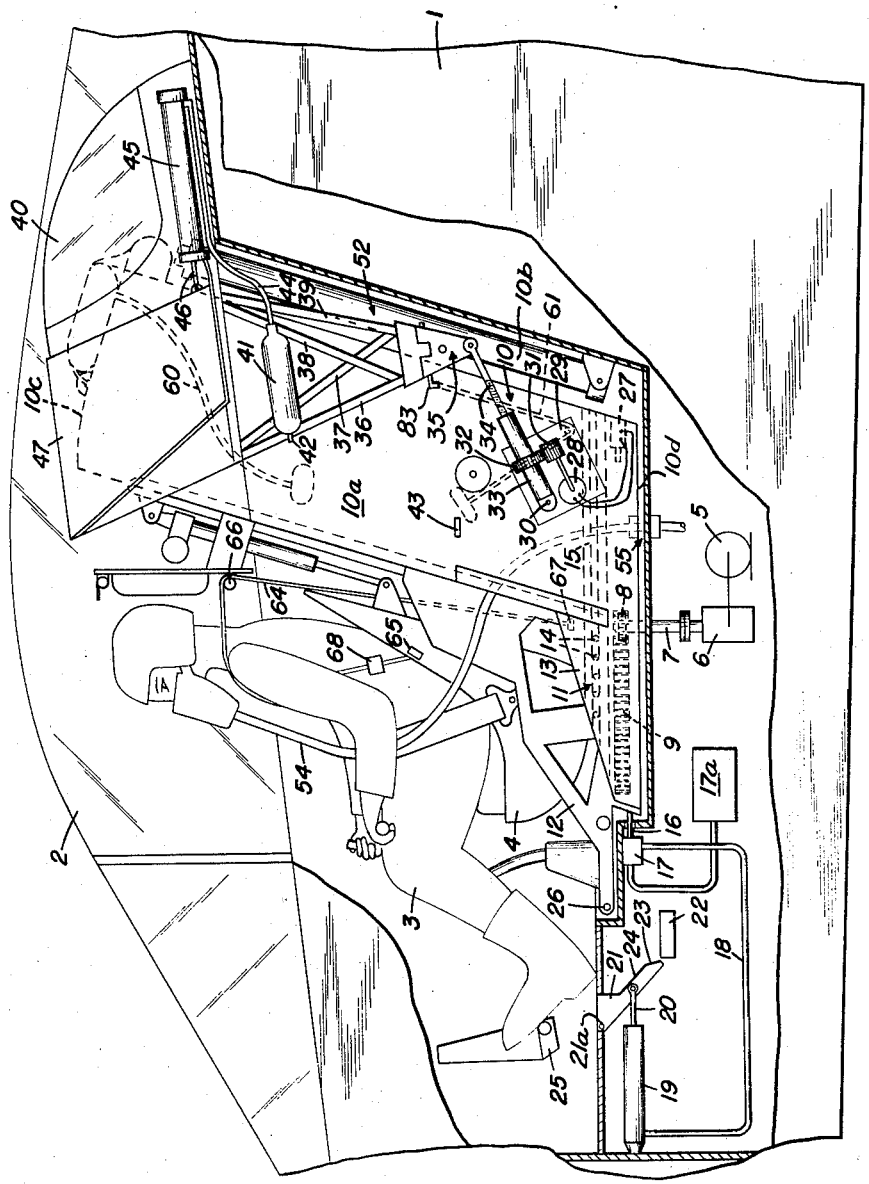
Fig. 1 is a cut-away elevation view of an aircraft fuselage containing an ejectable capsule and showing the pilot in normal flight position.

In Fig. 1 of the drawings, numeral 1 is the fuselage of the aircraft and numeral 2 represents the canopy which covers the cockpit. The pilot 3 is shown seated in seat 4 in the cockpit in normal flight position. It will be noted that the pilot is perfectly free to pursue his normal flight duties without any interference from the capsule escape mechanism which will be presently described. In the event of an emergency the pilot presses a switch (not shown) which may be placed at any convenient location on the control panel or on the seat 4 of the aircraft. This energizes electric motor 5 which is connected to gear box 6. At the end of output shaft 7, which protrudes from gear box 6, is keyed pinion 8 which is in mesh with rack 9, which is fixedly mounted to the seat 4. When motor 5, connected to the aircraft electrical system, is energized, seat 4 is caused to be moved toward the rear of the aircraft by rack 9 and pinion 8. The seat 4 is operatively mounted in capsule body 10 by means of interengaging surfaces shown generally at 11 between seat frame 12 and base 13 of capsule body member 10. The interengaging surfaces may consist of rollers 14 mounted on the seat frame 12 of a seat 4 which roll in channel 15 fixedly mounted in capsule body member 10. Capsule body member 10 is comprised of sides 10a, a back 10b, a top 10c, and a bottom 10d, thus providing a seat-admitting open front.

Provision is made for automatically moving the pilot's feet into the body portion 10 of the capsule in the following manner. As the seat 4 begins its rearward movement, spring pressed plunger 16, which abuts the mounting for rack 9, tends to follow the rearward movement of seat 4 and thereby causes valve 17 to open to line 18. Valve 17 is connected to a source of hydraulic pressure 17a. When valve 17 is opened by the rearward movement of seat 4, line 18 is connected to the source of hydraulic pressure which in turn transmits the pressure to the rear end of hydraulic cylinder 19. Pressure in cylinder 19 causes piston 20, which rides in cylinder 19, to move to the right in Fig. 1. Pivotally mounted on the right end of piston 20 is foot engaging member 21 and fixedly mounted on the body of the aircraft is block 22. As the piston 20 and attached member 21 move toward the right, cam surface 23 of member 21 comes in contact with block 22. Continued movement toward the right causes member 21 to rotate in a clockwise direction about its pivot point 24 (see Fig. 2) and thereby cause the upper portion of member 21 to engage the feet of the pilot and move them from aircraft controls 25 to footrest 26 (see Fig. 3) which is mounted on the seat frame 12. Conveniently, the upper portion of member 21 may comprise rods 21a, as shown in Fig. 6. Thus it can be seen that provision is made for automatically removing the pilot's feet from the aircraft controls and positioning them on the footrest of the movable seat which is retracted into body portion 10 of the ejectable seat capsule.

Shoulder harness 64 which passes around the pilot's shoulders has one end attached to the seat 4 at 65 and then passes around pulley 66 and has its other end attached to the body 10 of the capsule at 67. Quick release 68 may be positioned along harness 64 at any point where the pilot may have access thereto for the purpose of allowing the pilot to free himself from the harness when he wishes to leave the capsule. During normal flight, harness 64 is relatively loose and allows the pilot a maximum of freedom, whereas when the seat 4 is moved into capsule body 10 this harness securely braces the pilot within the capsule.

It will be noted that seat 4 continues its backward movement into ejection body member 10 until the rear portion of rack 9 abuts microswitch 27 which is connected to electric motor 28, which is connected to the aircraft electrical system. Motor 28 is mounted on bracket 29 which is pivotally mounted at 30 to body member 10.

Pinion 31 is keyed to the output shaft of motor 28 and meshes with gear 32 which is keyed to internally threaded, rotatable sleeve 33. When rack 9 abuts microswitch 27, motor 28 is energized which in turn causes sleeve 33 to rotate. Threaded shaft 34, one end of which is threaded into sleeve 33, is caused to be moved out of sleeve 33 as the latter rotates. The other end of shaft 34 is pivotally connected to bracket 35 which in turn is pivotally mounted on capsule body member 10. Struts 36, 37, 38 and 39 connect bracket 35 to the upper cover section 40 of the ejectable capsule. It is to be noted that the pilot is now in the rearmost position in the body portion 10 of the ejection capsule when the cover section, comprised of upper section 40 and lower section 47, begins to rotate in a counterclockwise direction about the pivot of bracket 35. Cover sections 40 and 42 are rotated by the aforementioned structure to the position shown in Fig. 2, upper section 40 then covering part of the front of capsule 10 and lower section 47 covering the remainder of the front.

Reference will now be made to Fig. 2. Affixed to struts 36, 37 and 38 (connections not shown) is compressed air bottle 41, having control pin 42 protruding therefrom. Mounted on the capsule body member 10 is control pin operating block 43. It can be seen that as upper cover section 40 is moved into the position shown in Fig. 2 that pin 42 abuts block 43 and causes the air pressure to be released from bottle 41. Hose 44 connects bottle 41 to cylinder 45 which is attached to cover section 40 and which has piston 46 therein. Piston 46 is connected to sliding lower cover section 47. It can thus be seen that as pressure builds up in cylinder 45 lower cover section 47 is caused to move into the position shown in Fig. 2 thereby completely enclosing the pilot. After the sliding cover 47 has reached the closed position as shown in Fig. 2 the air remaining in the bottle 41 is forced through outlet tube 48 into a hollow rubber seal 49 which is positioned between the cover and the body portion 10 of the capsule. The inflation of hollow rubber seal 49 provides air tight sealing between the sections and the body of ejection capsule. It can thus be seen that the aircraft cockpit pressure is sealed into the capsule. The canopy 2 is then blown off in the conventional manner and the pilot is then ready for ejection from the aircraft.

In order to eject the capsule from the aircraft the pilot pulls head curtain 150 which fires the catapult which ejects the capsule from the aircraft. The structure is generally shown in Fig. 3. Brackets 50 are rigidly attached to the body member 10 of the capsule. Channels 51 are attached to the body of the aircraft. The brackets 50 have sliding engagement with channels 51. The cartridge-type catapulting mechanism is shown generally at 52 and may be any suitable construction for propelling the ejection capsule from the body of the aircraft. When the catapulting mechanism is actuated, channels 51 in cooperation with brackets 50 determine the trajectory of the ejection capsule from the plane. It is to be noted that means for firing the catapult are safetied until the sliding cover of the capsule is closed and the canopy is jettisoned.

Oxygen bottles 53 are fastened to the backrest of seat 4. If these bottles contain sufficient oxygen, they may be used as the pilot's oxygen supply throughout his flight. However, if it is desired to only provide a small supply of oxygen within the ejection capsule because of space considerations or other design requirements, the inside of the capsule may be provided with a junction box (not shown) leading from oxygen bottles 53 into which the pilot may insert the tube 54 of his oxygen mask either before or after the capsule has left the aircraft. If this procedure is followed, the pilot's normal oxygen supply during flight is obtained from an oxygen source (not shown) and conveyed to the pilot through quick disconnect 55, one portion of which is connected to the capsule and the other portion to the fuselage. It will also be noted that the quick disconnect 55 may be utilized for connecting the pilot's head set, microphone, and heated flying suit lines to their respective sources of power. It will thus be noted that in accordance with one of the objects of this invention this construction provides a minimum of connections between the fuselage 1 and the ejectable seat capsule. Furthermore it will be noted that this connection at 55 remains closed until the exact instant that the capsule is ejected from the aircraft thus allowing the pilot to use his radio and have power supplied to his flying suit until the instant of ejection.

Fig. 4 discloses the capsule after it has been ejected from the fuselage of the aircraft. A drogue parachute 56 automatically opens immediately after capsule ejection for the purpose of stabilizing the ejected capsule. One convenient method of automatically opening the drogue parachute 56 is to have cable 57 have one end fixedly attached to the fuselage at 58 (Fig. 2). The other end of cable 57 may have pins (not shown) attached to drogue parachute 56 in the well known manner so that when the capsule is ejected from the aircraft, the pins will be pulled from the parachute allowing the parachute to open. Other means may also be used for automatically opening the drogue parachute 56. In addition to drogue parachute 56, which is used for stabilizing the ejected capsule, parachute 59 is also attached to the capsule. Parachute 59 is used for the purpose of slowing down the falling capsule and/or effecting the final descent of the capsule after the capsule has reached a relatively low altitude. Parachute 59 may be manually opened by the pilot by his pulling cable 60 which releases the pins holding parachute 59 in the closed position. However, in lieu of this construction an automatic barometric device (not shown) may be utilized to open parachute 59 at a predetermined altitude. This latter construction may be preferable in case the pilot is unconscious or for some other reason is incapable of manually opening the parachute 59.

Referring to Figs. 4 and 5 it will be noted that if for some reason the pilot desires to leave the ejected capsule after parachute 59 has opened and then use his own parachute for final descent he can do so. This procedure would be advantageous if the capsule was descending over water and the pilot desired to leave the capsule so that he could use his inflatable rubber life raft which is usually connected to his parachute harness. If the pilot desires to leave the capsule while it is in the air he pulls cable 61 which is affixed to the inside of capsule body 10. This cable is passed around pulley 62 and affixed at one end to pin 83 which holds parts 84 and 85 of separable bracket 35 together. It can be readily seen that when pin 83 is pulled from bracket 35 that the pilot can kick sections 40 and 47, comprising the cover portion of the ejectable capsule, from the body portion 10. This can be accomplished quite easily since pin 83 provides the sole rigid connection between the cover section and the capsule. Attention is directed to Fig. 5 for a view of the ejectable seat capsule in disassembled condition. It is to be further understood that in case the pilot decides to ride with the capsule until it reaches the ground that the above described escape mechanism is utilized for the purpose of allowing the pilot to remove himself from the capsule.

In the foregoing explanation, reference, for the most part, has been made to only one side of the apparatus. It is to be understood that wherever the apparatus described is symmetrical, or substantially so, that the description of one member serves also to describe its symmetrical counterpart.

It is further understood that the frame portions of the ejectable capsule are to be constructed so as to withstand the high forces involved. The cover section may be constructed of Plexiglas or other transparent material so as to allow the pilot to see out of the capsule. Furthermore the capsule should be made of a strong heat retaining material, such as Metalite, which will retain the heat within the capsule as well as lending strength to the capsule.

Obviously many modifications and variations of the present invention are possible in the light of the above teachings. It is therefore to be understood that within the scope of the appended claims the invention may be practiced otherwise than as specifically described.

Having thus described the invention I claim:

1. An aircraft, an ejectable seat arrangement for said aircraft for ejecting a person from said aircraft comprising a seat in said aircraft for seating a person, a capsule in said aircraft having a body portion and a cover portion, said seat being normally spaced from said capsule, means connected to said seat and aircraft for moving the seat into the body portion of the capsule including means for moving the person's feet onto the seat, means connected to said capsule cover for moving the capsule cover to a closed position whereby the capsule cover completely encloses the pilot seat, and means connected to said aircraft and capsule for ejecting the capsule from the aircraft.

2. An aircraft, an ejectable seat arrangement for said aircraft comprising a seat in said aircraft, a normally open capsule in said aircraft having a body portion and a cover section, said seat being normally spaced from said capsule, means connected to said seat and aircraft for moving the seat into the capsule body portion, means connected to said capsule cover for moving the capsule cover section relative to said capsule body portion to close the capsule and thereby completely enclose the pilot seat, means connected to said aircraft and capsule for ejecting said closed capsule from the aircraft, and means operable from within said capsule and connected to said capsule cover section for opening said capsule after it has been ejected from the aircraft.

3. An ejection apparatus comprising a seat, a capsule spaced from said seat, said capsule comprising a top, back, sides and a bottom, a cover section for the front of said capsule hingedly connected to said capsule, said cover section comprising an upper section adapted to cover part of the front of said capsule, and a lower section adapted to cover the remainder of the front of said capsule, said lower section being slidably mounted on said upper section, means connected to said seat to move said seat into said capsule, and means connected to said cover section to move said cover section into position to close the front of said capsule.

4. An ejection apparatus comprising a seat, a capsule spaced from said seat, said capsule comprising a top, back, sides and a bottom, a cover section for the front of said capsule, separable means hingedly connecting said cover section to said capsule, said cover section comprising an upper section adapted to cover part of the front of said capsule and a lower section adapted to cover the remainder of the front of said capsule, said lower section being slidably mounted on said upper section, means connected to said seat to move said seat into said capsule, means connected to said cover section to move said cover section into capsule closing position, and means operable from within said capsule and engageable with said separable means to actuate said separable means, whereby said cover section may be separated from said capsule.

5. An aircraft, ejection apparatus therein comprising a seat, a capsule spaced from said seat, said capsule comprising a top, back, sides and a bottom, a cover section for the front of said capsule, means hingedly connecting said cover section to said capsule, said cover section comprising an upper section adapted to cover part of the front of said capsule and a lower section adapted to cover the remainder of the front of said capsule, said lower section being slidably mounted on said upper section, means connected to said seat and aircraft to move said seat into said capsule, controls in said aircraft adapted to be actuated by the feet of the occupant of said seat, a footrest mounted on and movable with said seat, and means in said aircraft to impel the feet of the occupant of said seat from said controls and to said footrest.

6. An aircraft, ejection apparatus therein comprising a seat, a capsule spaced from said seat, means connected to said seat and aircraft to move said seat into said capsule, controls in said aircraft adapted to be actuated by the feet of the occupant of said seat, a footrest attached to said seat, means in said aircraft movable to push the feet of the occupant of said seat from said controls and to said footrest, and means responsive to movement of said seat and connected to said latter mentioned means to cause movement of said latter mentioned means upon movement of said seat.

7. An aircraft, ejection apparatus therein comprising a seat, a capsule spaced from said seat, means connected to said seat to move said seat into said capsule, controls in said aircraft adapted to be actuated by the feet of the occupant of said seat, a footrest attached to said seat, a valve in said aircraft adapted to be connected to a source of pressure, an hydraulic cylinder operatively connected with said valve, foot engaging means in said aircraft and supported for movement against the feet of the occupant to impel the feet of the occupant of the seat from said controls and to said footrest, means connecting said hydraulic cylinder to said foot engaging means, means in operative relation with said seat to open said valve upon movement of said seat into said capsule, whereby said foot engaging means will engage the feet of the occupant of said seat and impel them to said footrest.

8. An aircraft, ejection apparatus therein comprising a seat, a capsule spaced from said seat, means connected to said seat to move said seat into said capsule, controls in said aircraft adapted to be actuated by the feet of the occupant of said seat, a footrest attached to said seat, a valve in said aircraft adapted to be connected to a source of fluid under pressure, a spring pressed plunger in said valve, said plunger being normally held in closed position by said seat when said seat is adjacent said controls, an hydraulic cylinder operatively connected with said valve, a floor board in said aircraft underlying said controls, a slot in said floor board, foot engaging means underlying said floor board comprising a member lying in a vertical plane relative to said floor board and positioned beneath said slot, said cylinder being pivotally attached to said foot engaging means near the mid-point thereof, and a stop fixedly attached to said aircraft adjacent the lower end of said foot engaging member, whereby when said seat is moved toward said capsule said spring pressed plunger will permit fluid to flow to said cylinder and said foot engaging member will be caused by said cylinder and stop to rotate upwardly through said slot and impel the feet of an occupant of said seat to said footrest.

9. An ejection apparatus comprising a seat, capsule spaced from said seat, said capsule comprising a top, back, sides and a bottom, a cover section for the front of said capsule connected to said capsule by hinge means, said hinge means being connected to said capsule and comprising pin means extending generally parallel to the back of said capsule and transversely of the sides thereof, said cover section comprising an upper section adapted to cover part of the front of said capsule and a lower section adapted to cover the remainder of the front of said capsule, said lower section being slidably mounted on said upper section, motor means mounted on said capsule and operatively connected to said cover section, means connected to said seat to move said seat into said capsule, and motor control means in said capsule engageable by said seat, whereby upon movement of said seat into said capsule, said motor control means will be engaged by said seat and said motor will rotate said cover section into capsule closing position about said hinge means.

10. Apparatus according to claim 9, together with a fluid motor mounted on said upper section and engageable with said lower section, a source of fluid under pressure connected with said fluid motor, means to control the admittance of fluid to said fluid motor mounted on said cover section, and control means operating means on said capsule positioned to actuate said control means when the upper section is in capsule closing position, whereby when said upper section moves to capsule closing position, said valve operating means will open said valve, fluid will be admitted to said fluid motor, and said lower section will slide into capsule closing position under compulsion of said fluid motor.

11. An ejection apparatus comprising a capsule, a seat in said capsule, said capsule having a seat admitting open front, a cover section for the open front of said capsule, means pivotally connecting said cover section to said capsule, said means comprising a first part pivotally attached to said capsule and a second part attached to said cover section, a removeable pin connecting said parts, and means engageable with said pin to remove said pin whereby said parts will be released upon removal of said pin.

12. Apparatus according to claim 11 wherein said latter mentioned means extend into said capsule, and is operable therefrom.

13. The apparatus of claim 5, and further including means in said aircraft responsive to movement of said seat and connected to said impelling means to cause actuation of said impelling means upon movement of said seat.

References Cited in the file of this patent

UNITED STATES PATENTS

| | | |
|---|---|---|
| 2,480,335 | Nordmark | Aug. 30, 1949 |
| 2,527,020 | Martin | Oct. 24, 1950 |
| 2,528,532 | Martin | Nov. 7, 1950 |
| 2,536,086 | Pomykala | Jan. 2, 1951 |
| 2,733,027 | Gero | Jan. 31, 1956 |

OTHER REFERENCES

"Aviation Week," publication, April 14, 1952, page 61, 244–140.

"Aviation Week," publication, April 3, 1950, page 28, 244–140.